(12) United States Patent  (10) Patent No.: US 8,975,784 B2
Tardy  (45) Date of Patent: Mar. 10, 2015

(54) METHOD FOR MANAGING AN ELECTRICAL NETWORK

(75) Inventor: Alain Tardy, Paris (FR)

(73) Assignee: Thales, Neuilly sur Seine (FR)

( * ) Notice: Subject to any disclaimer, the term of this patent is extended or adjusted under 35 U.S.C. 154(b) by 699 days.

(21) Appl. No.: 13/149,015

(22) Filed: May 31, 2011

(65) Prior Publication Data

US 2011/0273012 A1   Nov. 10, 2011

Related U.S. Application Data

(63) Continuation of application No. 12/937,255, filed as application No. PCT/EP2009/054332 on Apr. 9, 2009, now abandoned.

(51) Int. Cl.
  *H02J 1/00*  (2006.01)
(52) U.S. Cl.
  USPC ............... 307/82; 307/9.1; 307/84; 323/284
(58) Field of Classification Search
  CPC .............. H02J 1/102; H02J 3/06; H02J 4/00; H02J 7/34
  USPC ................. 307/9.1, 82, 84; 323/284
  See application file for complete search history.

(56) References Cited

U.S. PATENT DOCUMENTS

| 4,394,572 A | 7/1983 | Wilber |
| 6,420,205 B1 | 7/2002 | Sawai |
| 6,441,581 B1 | 8/2002 | King et al. |
| 7,876,542 B2 * | 1/2011 | Rozman et al. ................. 361/87 |
| 2004/0036462 A1 | 2/2004 | Evers et al. |
| 2004/0119454 A1 * | 6/2004 | Chang et al. .................. 323/284 |
| 2006/0061213 A1 * | 3/2006 | Michalko ....................... 307/9.1 |
| 2009/0189455 A1 * | 7/2009 | Rusan et al. .................... 307/82 |
| 2009/0190279 A1 * | 7/2009 | Rusan et al. ................. 361/93.6 |
| 2009/0224599 A1 * | 9/2009 | Yue et al. ....................... 307/9.1 |

FOREIGN PATENT DOCUMENTS

| DE | 1299087 | 7/1969 |
| EP | 0348361 | 12/1989 |
| FR | 2899734 | 10/2007 |
| WO | 2007/113312 | 10/2007 |

* cited by examiner

*Primary Examiner* — Jared Fureman
*Assistant Examiner* — Alfonso Perez Borroto
(74) *Attorney, Agent, or Firm* — Baker & Hostetler LLP

(57) ABSTRACT

The invention relates to a method for managing an electrical network. The electrical network includes two power centers making it possible for each one to supply several loads, each power center including: an electrical power supply bus, a plurality of reversible converters making it possible to exchange energy between the bus and the various loads, routing means making it possible to vary an association between the converters and the loads, an energy storage element. According to the invention, if for a first of the power centers, the regenerated power cannot be dissipated in the other loads associated with the first center, the regenerative load dissipates its power toward the bus of the second power center.

4 Claims, 1 Drawing Sheet

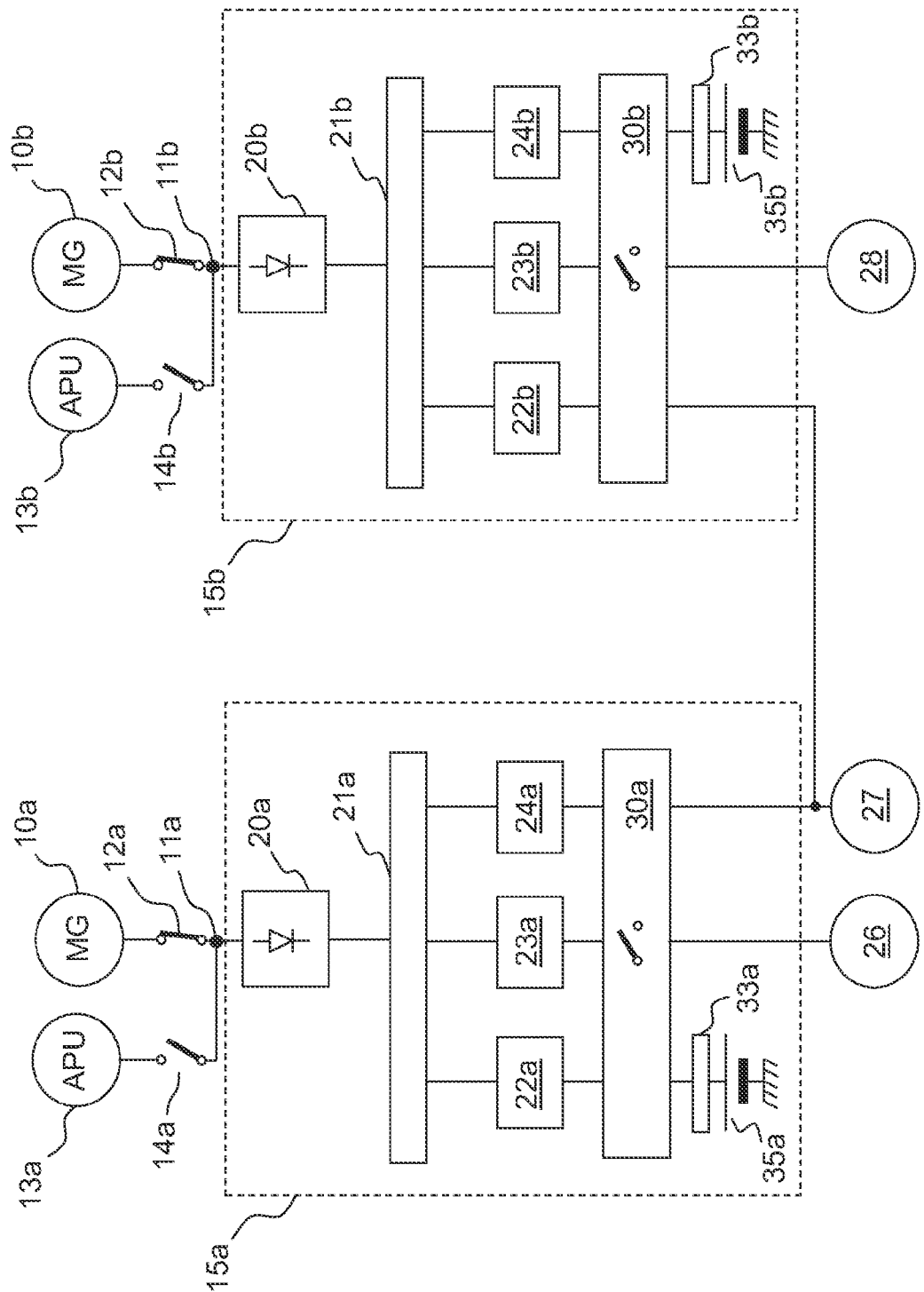

METHOD FOR MANAGING AN ELECTRICAL NETWORK

CROSS-REFERENCE TO RELATED APPLICATIONS

This application is a continuation of U.S. application Ser. No. 12/937,255, filed on Oct. 9, 2010, now abandoned which is a National Stage of International patent application PCT/EP2009/054332, filed on Apr. 9, 2009, which claims priority to foreign French patent application No. FR 08 01952, filed on Apr. 9, 2008, the disclosures of all of which are incorporated in their entirety herein by reference.

FIELD OF THE INVENTION

The invention relates to a method for managing an electrical network. The invention finds a particular utility in aeronautics for wide-bodied commercial aircraft which comprise ever more onboard electrical equipment. Such equipment varies greatly in nature and its energy consumption varies greatly over time. By way of example, internal air-conditioning and lighting systems are in almost continuous operation while redundant security systems such as airfoil controls, are used only exceptionally.

Generally, the aircraft is furnished with a three-phase electrical energy provision bus allowing power to be supplied to all the electrical equipment, subsequently called loads. Recently, subsequent to the appearance of high power loads (electric motors or AC sub-networks) that need to be supplied by three-phase voltage inverters, high-voltage DC buses supplied from the AC bus through rectifiers have been installed aboard aircraft. These high-voltage DC buses are well known in the literature by the name HVDC, standing for: "High Voltage Direct Current". Hereinafter, the high-voltage DC bus will be called the HVDC bus.

The various loads may require different energy feeds in terms of voltage and nature of current, AC or DC. In French patent application, No. FR 2 899 734 filed in the name of the applicant, there has been proposed a mutualization of converters that can supply various loads as a function of their instantaneous requirement in terms of electrical energy, from an energy provision bus.

Several problems are currently not solved. With the increase in the number of electrical loads, some of them may sometimes regenerate electrical energy. At present, the regeneration is taken into account locally at the level of the load considered by providing local means for dissipating the energy produced by the load such as for example resistors allowing the dissipation of the energy regenerated through the Joule effect. Among the regenerative loads aboard an aircraft are for example electrically operated flight controls. When one seeks to brake an airfoil, the associated flight control regenerates electrical energy.

Indeed, a load returning energy to a bus may give rise to an instability of the bus.

SUMMARY OF THE INVENTION

The invention is aimed at alleviating this problem by proposing a particular method for managing a network comprising mutualized converters.

An aim of the invention is to avoid the dissipation without reuse of the energy regenerated by certain loads.

Another aim of the invention is to minimize the reconfigurations of the association between converters and loads.

An aircraft is also furnished with batteries making it possible to supply certain loads when onboard or external electrical generators are not available. In particular, the batteries must back up certain computers or certain critical electrical systems such as for example the flight controls, the braking, the thrust reversal of the engines or the starting of turbines through a low-voltage DC bus. The invention also makes it possible to link these batteries to the mutualized converters.

For this purpose, the subject of the invention is a method for managing an electrical network comprising
 an electrical power supply bus,
 several loads able either to provide or to consume electrical energy of the bus,
 a plurality of reversible converters making it possible to exchange energy between the bus and the various loads
 routing means making it possible to vary an association between the converters and the loads,
the method being characterized in that if a load regenerates energy, this energy is dissipated in other loads.

BRIEF DESCRIPTION OF THE DRAWINGS

The invention will be better understood and other advantages will become apparent on reading the detailed description of an embodiment given by way of example, which description is illustrated by the appended drawing in which:

FIG. 1 represents an exemplary electrical network implementing the invention.

DETAILED DESCRIPTION

The invention is described in relation to an electrical network implemented in an aircraft. It is of course possible to implement the invention in other sectors, particularly sectors using onboard electrical networks.

FIG. 1 schematically represents various items of electrical equipment aboard an aircraft notably a wide-bodied commercial aircraft. This aircraft has two main generators 10a and 10b denoted MG. Each generator is driven by one of the aircraft's engines. The generators 10a and 10b operate when the aircraft's engines operate and deliver for example a voltage of 115 V at a frequency of 400 Hz to AC buses, respectively 11a and 11b of the aircraft. Disconnection means 12a and 12b making it possible to open the link linking each generator 10a and 10b to the associated bus 11a and 11b. Associated with each main generator, an auxiliary generator 13a and 13b, denoted APU, is driven by a turbine dedicated to each generator 13a and 13b so as to provide the voltage of 115 V to the corresponding AC bus 11a and 11b. Likewise, disconnection means 14a and 14b make it possible to open the link linking the auxiliary generator 13a or 13b to the corresponding bus 11a or 11b. The turbine operates by using the aircraft's fuel and is implemented when the aircraft is on the ground.

Aboard the aircraft is also installed, associated with each bus 11a and 11b, a power cabinet 15a and 15b. This type of cabinet is well known in the literature by the name "Power Center". The two cabinets 15a and 15b are similar and to simplify the subsequent description just one will be described. The cabinet 15a comprises a rectifier 20a connected to the AC network 11a and making it possible to deliver a DC voltage to a high-voltage DC electrical power supply bus 21a denoted HVDC according to an abbreviation standing for: "High Voltage Direct Current". A voltage commonly used for the high-voltage DC bus 21a is 540V.

The DC bus 21a supplies several energy converters 22a to 24a each intended to supply a load, for example 26 and 27 by way of routing means 30a. The representation of FIG. 1 is schematic. In practice, a load may be supplied by several converters or else one converter can supply several loads. Certain loads may be supplied with DC voltage and the associated converter then converts the voltage of the DC bus 21a into a voltage usable by the load considered. In a wide-bodied aircraft there are numerous loads using an AC voltage of 115 V at a frequency of 400 Hz. To supply these loads, the converters 22a to 24a are inverters. Known inverters have the particular feature of being reversible.

Each converter 22a to 24a may be assigned in real time to the various loads 26 and 27 as a function of each load's instantaneous requirement and as a function of the availability of each of the converters 22a to 24a. The routing means 30a make it possible to vary in real time the association between converters 22a to 24a and loads 26 and 27. The association of the converters 22a to 24a and loads 26 and 27 is done as a function of the requirement in terms of instantaneous current and of the mode of instantaneous command of the load associated therewith. The mode of command of the load depends essentially on the type of load. By way of example which is commonly implemented in an aircraft may be cited the regulation of speed, torque or position, anti-icing or deicing, operation at constant power and diverse strategies for engine command (defluxing, command with or without sensor).

The routing means 30a comprise for example electrically controlled breakers making it possible to associate each converter with all the loads which are compatible therewith. By compatible is meant the fact that several loads can operate with the aid of the same converter, notably when they require the same power supply, for example a voltage of 115 V at a frequency of 400 Hz. The converters making it possible to deliver one and the same power supply form a group whose members are interchangeable. The various members of a group are advantageously identical. This reduces the production costs of the converters by standardizing their manufacture and makes it possible to simplify aircraft maintenance by stocking just one type of converter. As will be seen subsequently, certain types of converters can deliver several different power supplies as a function of the mode of operating the converter. Thus, with one and the same group of converters it is for example possible to associate loads operating under AC voltage, for example 115 V 400 Hz, and loads operating under DC voltage such as batteries for example.

The group is reconfigurable as a function of the instantaneous requirement of the loads that may be supplied by this group. It is not necessary to have a converter dedicated to each load. Indeed, the loads do not all operate simultaneously. The number of converters of one and the same group is defined as a function of the instantaneous maximum power that the set of loads associated with a group can consume. This power is less than the addition of the maximum powers of each load. The routing means 30a therefore make it possible to reduce the number of onboard converters and therefore the mass of these converters.

Moreover, reconfiguration makes it possible to improve the availability of the loads. Indeed, in the case of a faulty converter, another converter of the same group can immediately take over to supply a given load. Certain critical loads, such as for example airfoil controls, can thus operate with a secure power supply without, however, requiring the redundancy of a converter dedicated solely to these controls. The set of converters of one and the same group then forms a common resource capable of supplying a group of loads. Inside one and the same common resource, the various converters of which it is composed are undifferentiated.

A particular load of the network consists of an energy storage element such as for example a battery, a capacitor, or a supercapacitor 35a hooked up to one of the converters by way of the routing means 30a. In a conventional manner on an aircraft, it is known to use a battery of nominal voltage 28V DC. Other battery voltages are of course possible for the implementation of the invention. On the basis of a 540V DC bus 21a it is possible to operate the converter 22a in such a way that it delivers the DC voltage of 28V directly to a second DC bus 33a that can supply the energy storage element 35a. It is possible to insert between the second bus 33a and the energy storage element 35a a battery charger making it possible to regulate the current charging the battery. It is also advantageous to insert a transformation and rectification unit between the converter 22a and the energy storage element 35a, to charge the energy storage element 35a.

This unit is well known in the literature by the name "Transformer Rectifier Unit" and will subsequently be called: TRU. The TRU is supplied by the AC bus of the aircraft and provides a DC voltage of 28V. The TRU generally comprises a transformer operating at the frequency of the aircraft's AC network, for example between 300 HZ and 1200 Hz. The TRU is supplied with 115 V 400 Hz AC voltage and provides a DC voltage of 28V. The use of a TRU facilitates the operation of the converter 22a used as an inverter which receives a DC voltage of 540V. It is possible to consider the set formed by the TRU and the energy storage element 35a as a load that can be associated with one of the converters by the routing means 30a.

It is assumed that the load 27 is able either to consume energy or to generate electrical energy. According to the invention, when the load 27 regenerates energy, this energy is returned by the converter associated with the load 27 to the bus 21a. The converter being bidirectional, there is no need to modify the association carried out by the routing means 30a between the period where the load 27 consumes and the period where the load 27 dissipates energy.

In the example represented, the load 27 dissipates the energy that it regenerates toward the load 26. Overall the bus 21a is an energy consumer. Stated otherwise, the energy consuming loads linked to the bus 21a are capable of consuming all of the energy that the bus 21a receives, notably, through the rectifier 20a and through the regenerative load 27.

Advantageously, if the regenerated energy cannot be dissipated in the other loads, in this instance the load 26, the battery 35 is charged. Here again, there is no need to modify the association carried out by the routing means 30a.

Advantageously, if for a first of the power centers, in this instance the center 15a, the regenerated power cannot be dissipated in the other loads associated with the center 15a, the regenerative load 27 dissipates its power toward the bus 21b of the second power center 15b. For this purpose, the load 27 is hooked up at one and the same time, to the routing means 30a and 30b so as to be able to dissipate the regenerated power either toward the bus 21a, through one of the converters 22a, 23a or 24a, or toward the bus 21b through one of the converters 22b, 23b or 24b.

If the regenerated energy cannot be dissipated in the other loads, one of the energy storage elements (35a, 35b) of one of the power centers is charged.

The invention claimed is:

1. A method for managing an electrical network including two power centers each configured to supply power to a plurality of several loads, each power center including an electrical power supply bus, a plurality of reversible converters each including two connections, routing means, and two energy storage elements at each of the two power centers, respectively, a first connection of the two connections of the plurality of reversible converters being connected to the electrical power supply bus and a second connection of the two connections being connected to the routing means, the method comprising:
- exchanging, at the plurality of reversible converters, energy between the electrical power supply bus and the plurality of loads;
- varying, at the routing means, an association between the plurality of converters and the plurality of loads of the two power centers; and
- generating regenerated power at a regenerative load associated with a first power center in the two power centers,
- wherein if for the first power center of the two power centers, the regenerated power cannot be dissipated in loads, other than the regenerative load, associated with the first power center, then the regenerative load dissipates the regenerated power directly toward the electrical power supply bus of the second power center.

2. The method as claimed in claim 1, further comprising:
- charging one of the two energy storage elements if the regenerated power cannot be dissipated in the loads different from the regenerative load.

3. The method as claimed in claim 2, wherein the electrical network is fitted in an aircraft.

4. The method as claimed in claim 1, wherein the electrical network is fitted in an aircraft.

* * * * *